March 28, 1967     G. D. GILLETT     3,311,829
CIRCULAR POLARIZATION DIVERSITY DATA TRANSMISSION SYSTEM
Filed May 27, 1964     3 Sheets-Sheet 1

INVENTOR
GLENN D. GILLETT

INVENTOR.
GLENN D. GILLETT

INVENTOR.
GLENN D. GILLETT

United States Patent Office 3,311,829
Patented Mar. 28, 1967

3,311,829
CIRCULAR POLARIZATION DIVERSITY DATA TRANSMISSION SYSTEM
Glenn D. Gillett, Los Altos, Calif., assignor, by mesne assignments, to the United States of America as represented by the Secretary of the Navy
Filed May 27, 1964, Ser. No. 370,739
4 Claims. (Cl. 325—56)

The present invention relates to an improved system for transmitting data to a receiving station from a guided missile, satellite, or other vehicle traveling above the surface of the earth.

In the transmission of signals from a missile or space vehicle to a receiving station for the purpose of tracking or telemetry, it is usually desirable (and frequently necessary) that the signal strength remain essentially constant despite any spinning motion of the vehicle or any "tumbling" which the vehicle may undergo during flight.

It has heretofore only been possible to approach this ideal condition, at the high frequencies employed in this form of communication, by utilizing one or more large ring antennas completely encircling the missile and with a number of radiating elements uniformly distributed around the ring. Such a system is inherently of massive proportions and greatly adds to the weight of the missile as well as requiring complex phasing networks between the antenna and the signal generator. In addition, such a phased ring antenna will not normally produce a uniform radiation pattern in a plane perpendicular to the missile axis unless the diameter of the missile is less than one-half the wave length of the operating frequency. Furthermore, by the very design of such an antenna, there is a severe limitation on the intensity of the signal that can be radiated in both fore and aft directions.

A more serious disadvantage in such a design, however, is that, since only a finite number of radiating elements are used, rapid variations in signal amplitude occur when the vehicle undergoes a rotation about its longitudinal axis, this non-uniformity being due to the "fringing" effect resulting from wave interference between the respective signals emitted from the individual radiating elements.

Previous attempts have been made to overcome these disadvantages, such for example as by utilizing a modified version of the so-called "turnstile" concept, in which four radiating elements disposed in quadrature are mounted exteriorly of the missile body. Such an arrangement, yielding a somewhat elliptical radiation pattern, is feasible only where the diameter of the projectile is small compared to one wavelength of the energy transmitted.

This condition is especially difficult to meet in the case of modern missiles and most types of re-entry bodies, which must be designed to withstand extremely high speeds when passing through the earth's atmosphere, and which have dimensions of necessity very large compared to the wave length of the operating frequency.

It would be highly desirable to provide a system which is essentially free of the above defects, and which can deliver a signal from a missile to a receiving station which, when demodulated, remains substantially uniform in strength for all missile roll angles and under all conditions of "tumbling." It is an object of the present disclosure to provide a system of this nature.

The basic principle underlying the present concept is that, if two fields of the same frequency and of equal energy levels are received at any given point, and if these two fields are each circularly polarized but in an opposite sense, then the resultant field will be that of a linearly-polarized field with an energy level equal to the sum of the individual energies of the two component fields. In the event that the component fields are not equal, the resultant field will be elliptically polarized, the degree of ellipticity being determined by the disparity in relative magnitude of the two component fields. In any event, the orientation of either the linearly polarized field or the major axis of the elliptically polarized field, will vary as the relative distance from the respective radiating antennas to the receiving point is varied. The orientation will progress through 360° as the relative distance varies over one complete wavelength.

The total energy of this combined field received at any point will be essentially constant and independent of the angle of rotation of the missile about its roll or "spin" axis. This remains true not only for transmission in the plane perpendicular to the axis of rotation, but also for all angles of transmission in reference to this roll axis from near 0° to near 180°, i.e., from nose-on to tail-on. With the currently-available circularly-polarized antennas, the total energy level will be substantially constant over a broad equatorial belt referenced to the spin axis of the missile and decreasing somewhat in intensity towards the polar regions near the nose and tail. Thus the vehicle's spin axis may be at a considerable angle to the velocity vector of the vehicle's path, and may even be precessing at considerable angles about its velocity vector without the total energy received at any point varying substantially or enough to interfere with the reception of telemetering or other signals at any point.

However, the total energy received at any such point will shift in character with the vehicle's rotation from right-hand to linear and then to left-hand sensed polarization. The full energy of this field can be received at all times by an antenna system that is arranged to receive separately but simultaneously both right- and left-hand sensed circularly polarized waves. Such an antenna system will also inherently be capable of receiving the linearly-polarized signals that bridge the transition during each change of sense of polarization received at any point, and which vary in the rotation of their axes of polarization, irrespective of the rotational angle of this linearly-polarized transition phase. Then the signals from the separate left- and right-hand sensed antenna systems will be amplified and detected separately, with the final receiver outputs summed to result in a final signal which is substantially constant from instant to instant independent of the instantaneous roll angle or rate of spin of the vehicle.

While theoretically, freedom from fringing and other amplitude effects can be obtained with only two perfectly circularly-polarized antennas which are mounted diametrically opposite each other, the present state of the art does not afford sufficiently broad angled circularly polarized radiation patterns to permit this to be done effectively without a substantial drop in signal energy in areas equally distant angularly, referenced to the line between the antennas. When the system of the present invention is employed with two or more pairs of oppositely-polarized antenna, no substantial variation in the total received signal energy occurs with vehicle rotation at any receiving point.

In one embodiment of the present invention, four antennas are mounted equally spaced around the periphery of the missile, in a common plane perpendicular to the missile axis, with each antenna being circularly polarized in a sense opposite to that of each of the adjacent antennas. If all four of these antennas are equally energized concurrently, the resultant radiation patterns will show a constant total energy radiated without regard to the angular rotation of the missile and substantially independent of the angle of transmission, with reference to the spin axis of the missile. Expressed differently, the total signal energy received from the missile at any point will be essentially free from fringing effects and other variants in amplitude independent of the angular position of the transmission path from the missile in reference to its roll axis. The degree of constancy of the resultant total received signal will depend on the degree to which the individual missile antennas are able to maintain uniform strength of true circularly-polarized radiation at the wider angles of radiation off the axis of the antenna. If this could be perfectly maintained at all angles, the resultant received signal would be completely uniform in intensity and totally independent of changes in vehicle orientation.

Because of the motion of the vehicle during flight, the receiving station will receive its primary field progressively from the left-hand sensed antenna, then a substantially linearly polarized signal—that is, the resultant sum of the two adjacent transmitting antennas on the missile of opposite polarity, and then from a right-hand sensed antenna, with the sequence being repeated in each 90-degree rotation of the missile. Consequently, the receiving station, as an integral part of the communication system, must be fitted with an antenna with duplicate receiving systems capable of receiving simultaneously both right- and left-hand sensed circularly polarized fields, and there amplifying the signals of opposite sense in separate channels, with the respective receiver outputs combined in a summing amplifier which acts to integrate the signals from the two channels into a single output of constant amplitude. Alternately, this result may be approached by the use of a selective device employed to choose only the output from the strongest of the two signals from the two channels.

One of the simplest means of achieving the capability of simultaneously receiving both right- and left-hand circularly polarized signals in a single antenna system is to employ two dipoles, which are of course capable only of receiving linearly-polarized signals, with the dipoles mounted coplanar at right angles to each other in space quadrature. Then the outputs of those two dipole antennas are combined in two separate receiver channels, with a 90-degree relative phase shift introduced in the signal from one dipole fed into the channel from the other dipole, the direct signal and the signal shifted in phase being maintained at equal amplitudes in each channel. The resultant signals in each of the two channels are thus effectively that from left and right circularly polarized antenna systems. The same effect may be achieved by introducing a 45-degree lagging phase shift in each channel and introducing a 45-degree leading phase shift in each cross link feeding the other channel. By definition, signals from two antennas with a 90-degree difference in space orientation and a 90-degree time phase shift are circularly polarized—i.e., they are in space and phase quadrature.

Once the two channels are fed with inputs that are effectively received from an antenna system circularly polarized in an opposite sense, the signals must be amplified and the final output combined, either in a summing amplifier for which the output should be essentially constant independent of missile roll axis, or they can be switched between the two channels to the strongest signal being received at each instant. The latter will not provide an output of constant amplitude but will have a theoretical total noise level that is slightly lower than the output of the summed dual channels.

Briefly stated, the signal transmitting system of the present invention consists of four or more antennas (the total always being an even number), equally spaced around the surface of the missile and preferably in a plane perpendicular to the axis of the missile, with each unit radiating a circularly-polarized field of which the sense of each is opposite to that of the adjacent antennas on either side, together with a receiving system with a single antenna system developing dual outputs corresponding to the outputs of antenna systems of oppositely-sensed circular polarization which are supplied to separate receivers, the outputs of which are then combined in any suitable manner.

An important advantage that can be realized from the use of a system such as disclosed herein is that only a finite and very limited number of alternately-sensed circularly-polarized radiating elements are required on the missile or other airborne vehicle, combined with a single multiple-outlet receiving antenna system supplying energy from oppositely polarized fields to a dual channel receiving system at the receiving station in which the outputs are combined into a single signal. The result is that an essentially uniform continuous transmission of intelligence is achieved between the missile and the receiving station regardless of any spinning action to which the missile may be subjected or of any other changes which may occur in the missile's attitude or orientation.

One object of the present invention, therefore, is to provide an improved system for the transmission of intelligence between a missile or other space vehicle and a receiving station, fixed or moving, airborne or earthborne.

Another object of the invention is to provide a data transmission system between an airborne vehicle and a receiving location in which the energy level of the data so transmitted remains essentially constant regardless of any changes which may take place in the orientation of the missile with respect to the receiving point.

A further object of the invention is to provide a telemetering system for an airborne vehicle which employs a plurality of individual antenna units certain ones of which are circularly polarized in a particular sense and the remaining ones of which are circularly polarized in an opposite sense, so that the total radiation emitted thereby is additive to result in a substantially uniform propagation pattern which does not change in regions angularly equidistant from the units of the antenna assembly.

Other objects and many of the attendant advantages of this invention will be readily appreciated as the same becomes better understood by the reference to the following detailed description when considered in connection with the accompanying drawings wherein.

Figure 2:
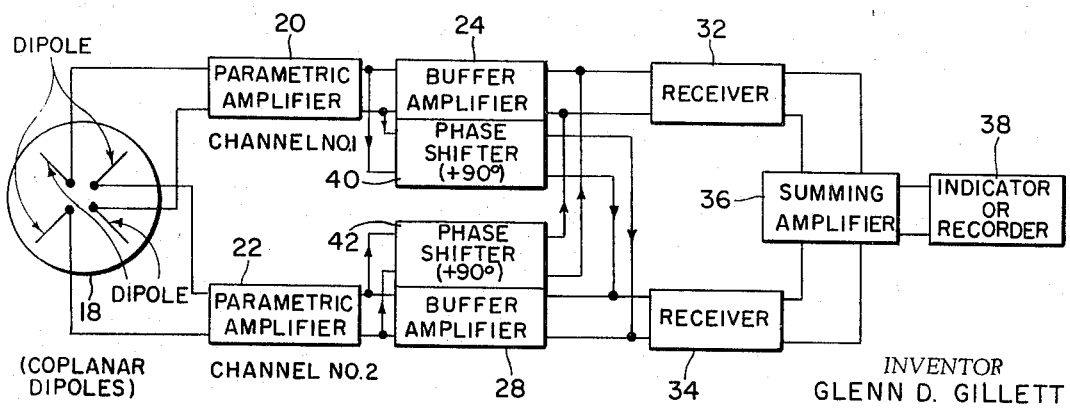
FIG. 2 is a block diagram of a preferred form of antenna-receiver system which may be used at a receiving station air or ground based fixed or mobile, to yield the data transmitted by the antenna assembly of FIG. 1.
Figure 3:
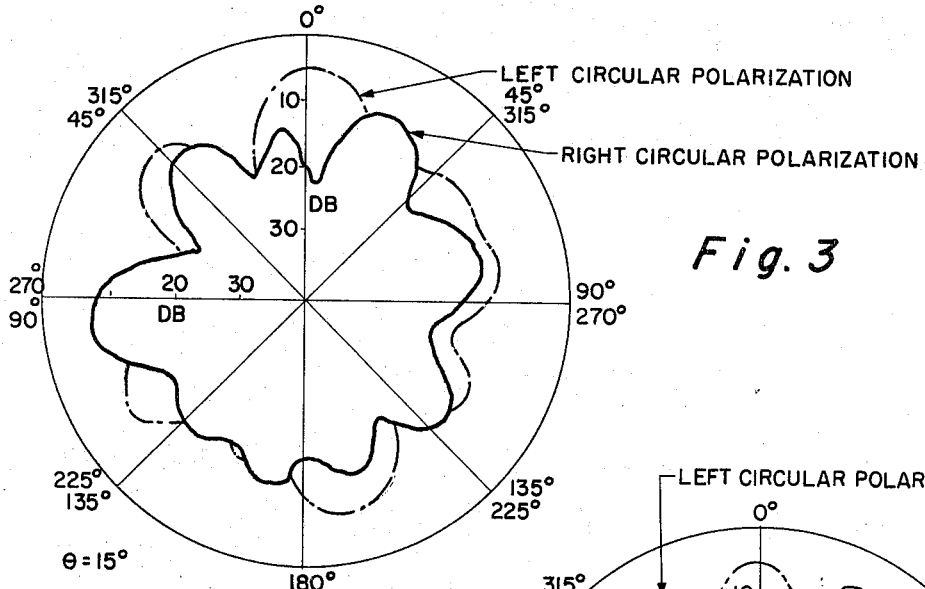
Figure 4:
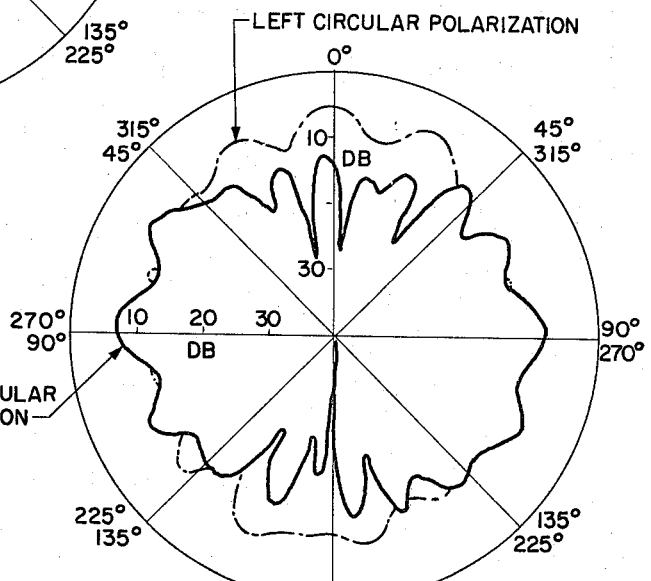
Figure 5:
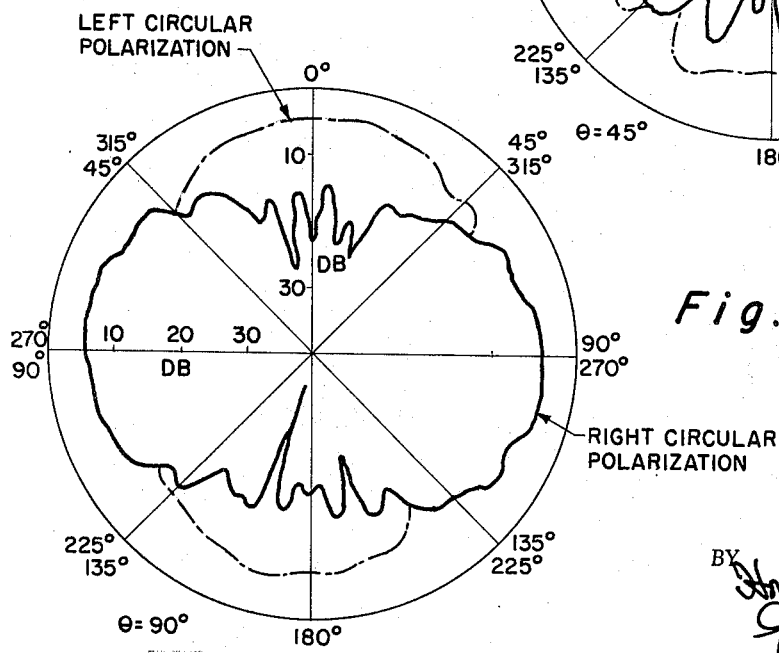
Figure 6:
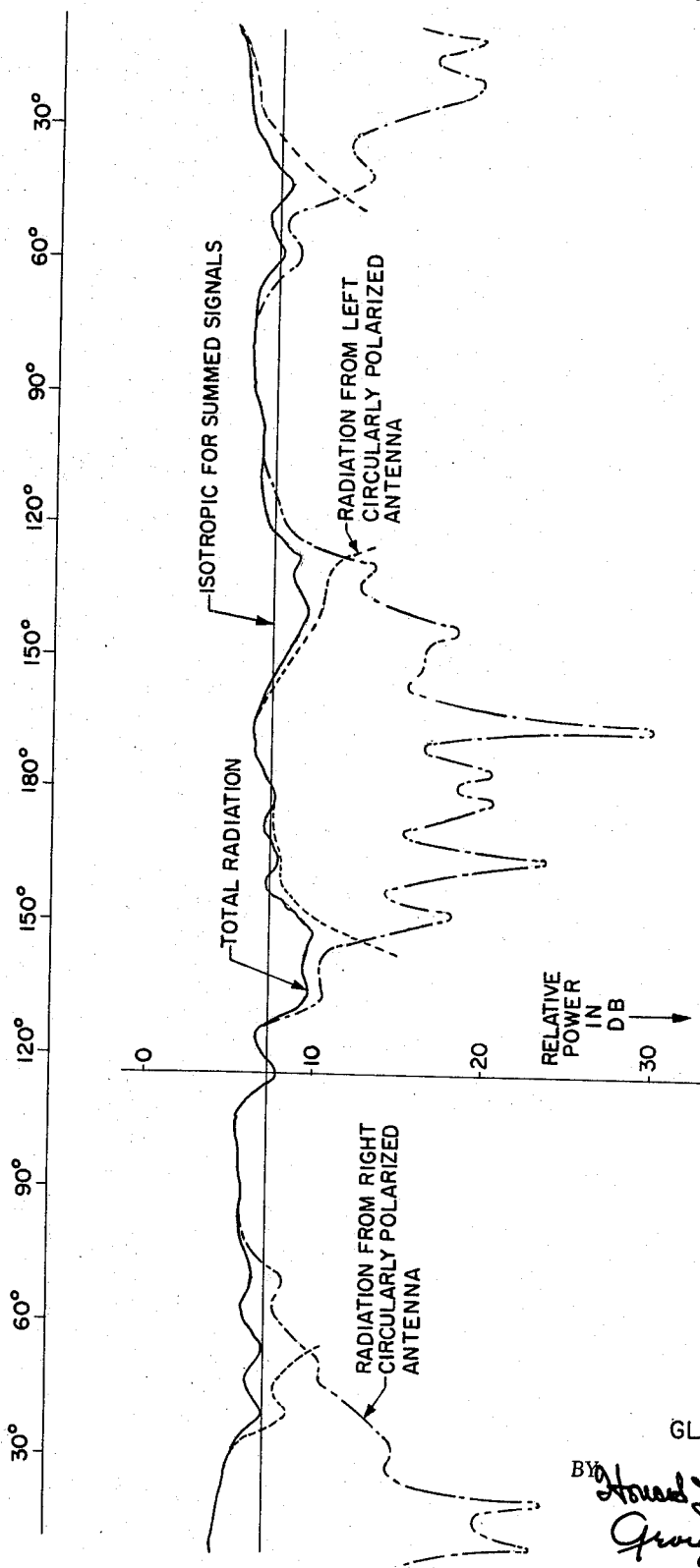

FIGS. 3, 4 and 5, respectively, are polar diagrams showing the energy levels received from an early developmental model of the system using antennas which were only approximately circularly polarized, with several db of ellipticity at the wider radiation angles off the antenna axis; and FIG. 6 is a chart illustrating the respective energy levels of the differently-polarized signals and also the total radiation receivable by a ground station of the type shown in FIG. 2.

Figure 1:
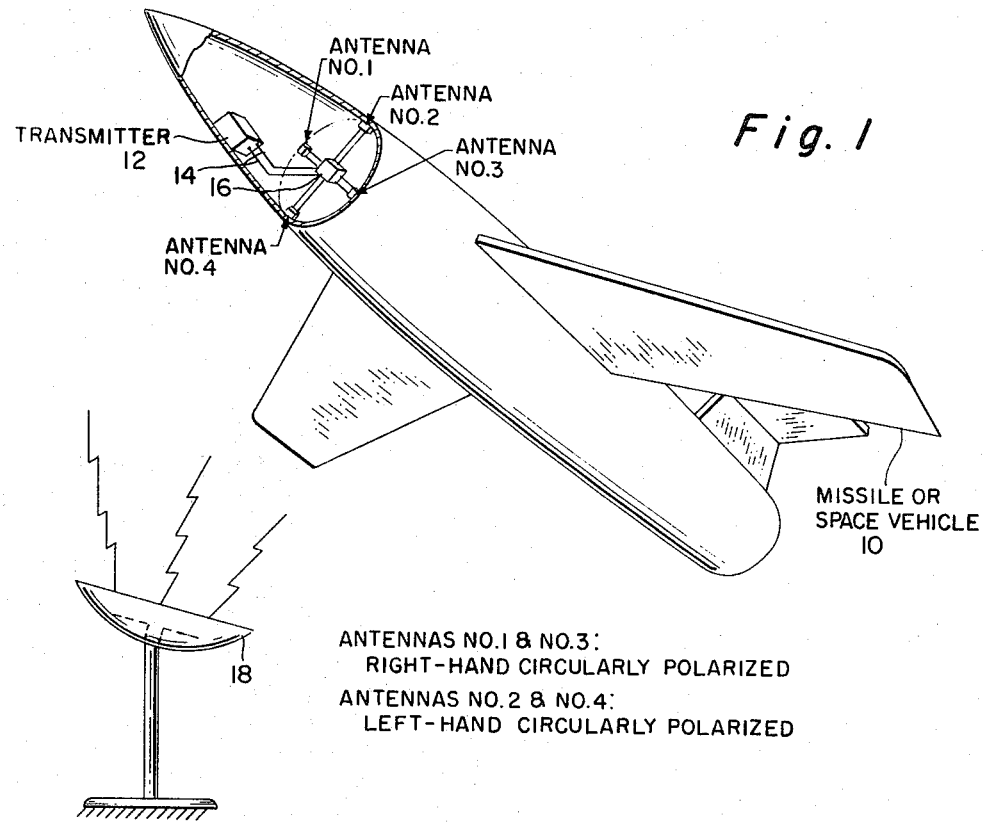
FIG. 1 is a somewhat schematic representation of a data transmission system designed in accordance with a preferred embodiment of the present invention, particularly showing one arrangement of the antenna units on a missile.

Referring now to FIG. 1 of the drawing, there is shown a perspective view of a guided missile 10 the skin of which is partly broken away in order to illustrate the arrangement of a preferred form of antenna assembly designed in accordance with the present invention. This antenna assembly consists of four antennas arranged in space quadrature, or, in other words, with the individual elements of the antenna system spaced 90° apart. For convenience of description, the four radiating members of the assembly will be designated as antennas #1, #2, #3 and #4, reading clockwise as viewed in the drawing. Each individual antenna element is supplied with energy from a conventional transmitter 12 over a pair of conductors 14 which lead to a common junction box 16. From the latter, separate connections are made to each of the antenna elements, so that the output of the transmitter 12 is fed with substantially equal power to each of the radiating members.

It is a feature of the present invention, in the embodiment of FIG. 1, that the output energy as radiated from each of the antenna units carried by the missile 10 is circularly-polarized. Furthermore, each individual unit of the antenna assembly is chosen so that this circular polarization is of a particular nature. Specifically, antennas #1 and #3 are not only circularly polarized, but in addition are selectively arranged to yield (for example) a left hand circular polarization. In a similar fashion, antennas #2 and #4 are chosen to produce an output wave which possesses right hand circular polarization. As shown in FIG. 1, the energy radiation from the antenna assembly carried by missile 10 is picked up at a ground, sea or airborne location by a receiving antenna 18 the details of which will be set forth in conjunction with a description of FIG. 2. It need only be mentioned at this point that the antenna 18 is designed to receive equally incoming energy which is circularly polarized in either a right or a left hand sense.

In FIGS. 3, 4 and 5 of the drawings there is shown representative polar diagrams of energy received from an antenna system of the type illustrated in FIG. 1. In all of these diagrams, the data is presented for cones of revolution off the forward or longitudinal axis of the missile 10. The showing of FIG. 3 is for an angle $\mu$ equal to 15°, the showing of FIG. 4 is for $\theta=45°$ and the showing of FIG. 5 is for $\theta=90°$. These polar charts illustrate the signal energy transmitted by the missile antenna assembly and received by the antenna 18 for both left hand circularly polarized radiation (set forth by the heavy line) and for right hand circularly polarized radiation (depicted by the broken line). While all these measured fields were taken using the first experimental unit were far from optimum in performance parameters, it will be apparent from these showings that the total radiation received is essentially isotropic in character, or, in other words, the sum of the two signals picked up by the receiving antenna 18 is essentially constant and of approximately the same amplitude regardless of the roll angle of the missile 10 during flight.

The curves of FIG. 6 are for a condition where the angle $\theta=90°$, and are being illustrated in order to more clearly show the antenna output power (in db) in a direction perpendicular to the axis of missile 10. The heavy black line in this figure is representative of the total radiation from both the right hand and the left hand circularly polarized antennas. It will be noted that this heavy black line closely approximates the isotropic energy level regardless of missile spin throughout a full 360° range. This result has heretofore not been capable of achievement by any antenna employed for analogous purposes.

The ground or airborne receiving system of FIGURE 2 indicates the manner in which the antenna 18 of FIGURE 1 is arranged to receive the particular type of energy radiated from the missile 10. The active elements of antenna 18 include a pair of dipoles arranged in coplanar space quadrature. The signal received by each dipole is fed to a parametric amplifier in order to reduce the noise threshold of the receiving system to the feasible minimum and to serve as a buffer or isolating amplifier. The output of the parametric amplifier 20 in receiving channel 1 feeds directly the buffer amplifier 24 in order to isolate the input of the time-phasing network 40 of this channel from the output of the time-phasing network 42 of channel 2. Similarly, the parametric amplifier 22 of channel 2 feeds directly the buffer amplifier 28 to isolate the input of the time phasing network 42 of this channel from the output of the time-phasing network 40 of channel 1. The output level of the signal from each of the phasing networks is made equal to the signal level in the direct channel for equal signal inputs into the respective dipoles of the two channels.

The basic objective attained by this network is to make the combined output of the two channels fed to the input of the receiver in each channel consist of the signal output from the dipole of that channel and the signal from the dipole of the other channel (which is mounted in space quadrature with the other dipole) shifted 90° in phase. Thus each channel carries the combined output of two dipoles mounted in space quadrature which are also in time phase quadrature. This by definition constitutes the output of a circularly-polarized receiving antenna system. The phasing relations in the network are established so that the resultant combined signal in one channel is circularly polarized with a right-hand sense and in the other channel is circularly polarized with a left-hand sense.

However, this arrangement represents but one embodiment of the many possible phasing network arrangements well known in the art which can be used to produce simultaneously from the outputs of the crossed dipoles outputs representing right- and left-hand sensed circularly-polarized antenna systems.

The effectiveness of the invention is not limited to the specific phasing network shown and it is contemplated that any of the standard phasing networks for accomplishing the desired objective may be used alternatively.

In order to develop the information received from the antenna system 18, the respective outputs of the phasing network system of channels 1 and 2 are fed separately to the inputs of the respective receivers 32 and 34. The amplified output of each receiver is then fed to the demodulator incorporated as an integral part of each receiver. The demodulated output of the respective receivers 32 and 34 of channels 1 and 2 are in turn fed to the summing amplifier 36. This amplifier serves to total the sum of the demodulated outputs from the receivers of the two channels. The combined output of the summing amplifier 36 is then in such form that it can be displayed on a conventional indicator or recorder (tape, film, etc.) 38.

From the curves of FIGURE 6, which were obtained when using experimental antenna units in the original experimental test system, that a substantially constant energy level is achieved in the reception of the transmissions from the missile, and that such energy level represents the sum of the individual signals transmitted from a missile antenna system in which the successive units are alternately circularly polarized in a right- and left-hand rotational sense. Although FIGURE 6 represents the measured received signal for transmission perpendicular to the missile axis (i.e., for an angle $\theta$ equal to 90°) similar results were obtained throughout substantially the full range of angles off the vehicle axis. It is especially significant that in each of the polar diagrams of FIGURES 3, 4 and 5 for the original experimental antenna system, that even there, there is no evidence of fringing or "sunflower" effects as the vehicle rotates through the full 360°. Consequently, when using the herein-disclosed system, sufficient energy to yield an adequate indication is receivable, despite body spin of a missile or other space vehicle, over all the aspect angles from direct nose-on to within 30° of the aft axis, or, in other words, from $\theta=0°$ to $\theta=150°$. Furthermore, that the deterioration of the signal in aft 30° was due directly to the flare or skirt of missile form with which the initial experimental tests were performed, and which are a characteristic of the missile form and not of the antenna system.

From the above discussion it can be concluded that any variation in strength of the signal received at a particular receiving station which is properly oriented with reference to the splash point (for example) of a re-entry body should not exceed one decibel during the entire period of tracking of the body from its apogee to such splash point. Consequently, the present invention permits the tracking antenna to lock onto and follow the vehicle during its entire downward course. The present invention also permits the reception and recording of telemetered data from the vehicle during the entire period when it is passing through the earth's atmosphere, as well as before its entry into the atmosphere. This result cannot be achieved with any antenna arrangement now known in the art.

Radiation diagrams (of which FIGS. 3, 4 and 5 are exemplary) show that the strength of the emitted signal will be constant within one decibel for a full 360° rotation of the re-entry body for all axial angles between 30° and 150°, considered with respect to the longitudinal axis of the vehicle. Even in the forward area within 30° of the vehicle axis, signal strength variations do not exceed two decibels during 260° vehicle spin or rotation. The polar diagrams of FIGS. 3, 4 and 5 are for an early experimental antenna model which possessed several db of ellipticity at the wider radiation angles off the antenna axis. Present refinements in design yield a guaranteed ellipticity of less than 1 db over a 120° cone or 60° angular arc of revolution, so that measurements made with such antennas would show greatly improved performance over the entire radiation angles involved. Evidently, the values of $\theta$ shown in FIGS. 3, 4 and 5 are in degrees from the vehicle's longitudinal axis, with 0° corresponding to nose-on.

Obviously many modifications and variations of the present invention are possible in the light of the above teachings. It is therefore to be understood that within the scope of the appended claims, the invention may be practiced otherwise than as specifically described.

I claim:
1. Communication system incorporating apparatus for enabling signals to be transmitted from a vehicle traveling above the surface of the earth to a receiving station, said system comprising:
   an antenna system mounted on said vehicle, said antenna system being designed to simultaneously transmit radiation from antenna units which are alternately circularly polarized in a left-hand and in a right-hand sense;
   a transmitter on said vehicle for energizing said antenna system;
   a receiver system located at any desired point, said receiver system further including an antenna system designed to receive the radiation emitted by said first antenna system;
   said receiver system incorporating a pair of channels through which respectively pass the right- and left-hand circularly-polarized energy picked up by said antenna receiving system; and
   means for combining the energy present in the output of each of said pair of receiver channels so that the amplitude level of the energy in the combined signals remains essentially constant regardless of variations in the orientation of the vehicle with respect to the receiving station during the course of the vehicle's flight.

2. Communication system in accordance with claim 1, in which said vehicle is of elongated configuration, the cross-sectional diameter of said vehicle being either greater or less than one-half the wavelength of said signals.

3. Communication system for enabling signals to be transmitted from a vehicle traveling above the surface of the earth to another such vehicle or to any receiving station; fixed or mobile; sea, air or ground borne, said system comprising:
   an antenna system mounted on said vehicle with successive units equally spaced around the vehicle designed to transmit from each antenna unit circularly polarized energy in opposite sense to that of the adjacent antenna units;
   a transmitter on said vehicle for energizing said antenna system;
   a receiver located at said receiving station, said receiver further including an antenna system designed to receive the radiation emitted by the said vehicle antenna system;
   said receiver incorporating a pair of channels through which pass respectively circularly-polarized energies of right- and left-hand sense picked up by said receiving antenna system; and
   means for combining the energy present in each of said pair of receiver channels so that the amplitude level of the total energy received remains essentially constant regardless of variations in the orientation of the vehicle with respect to the receiving station during the vehicle flight or the relative movement of the receiving station thereto;
   each channel of said receiver incorporating means for shifting by 90° the phase of the signal present therein and applying such phase-shifted energy to the remaining channel where it is combined with the energy present in such remaining channel.

4. A system for telemetering data from a missile to a ground or air receiving station, said system including:
   an antenna system mounted on said missile incorporating a plurality of antenna units from which signals are representing said data are simultaneously transmitted with both right- and left-hand circular polarization;
   a further antenna at said receiving station designed to receive the signals transmitted from said missile, said receiving station also including;
   a pair of signal channels to which the respective right- and left-hand circularly-polarized signals received from said missile are respectively applied;
   each of said signal channels including means for demodulating the particular signal present therein;
   means for combining the demodulated signals in the respective channels;
   an indicating device; and
   means for applying the signals so combined to said indicating device in order to reconstitute the telemetered data.

References Cited by the Examiner

UNITED STATES PATENTS

| | | | |
|---|---|---|---|
| 2,473,613 | 6/1949 | Smith | 343—756 X |
| 2,953,781 | 9/1960 | Donnellan et al. | 343—100 |
| 3,070,747 | 12/1962 | Addleman | 325—476 X |
| 3,093,824 | 6/1963 | Ammerman | 343—756 X |
| 3,184,743 | 5/1965 | Crawford | 343—100 |

DAVID G. REDINBAUGH, *Primary Examiner.*

B. V. SAFOUREK, *Assistant Examiner.*